June 28, 1927.

R. F. CRAWFORD 1,633,847

POWER TAKE-OFF MECHANISM FOR MOTOR VEHICLES

Filed Aug. 12, 1926     4 Sheets-Sheet 2

Inventor
Ralph F. Crawford
E. W. Anderson Jr.
Attorney

June 28, 1927.
R. F. CRAWFORD
1,633,847
POWER TAKE-OFF MECHANISM FOR MOTOR VEHICLES
Filed Aug. 12, 1926 4 Sheets-Sheet 3
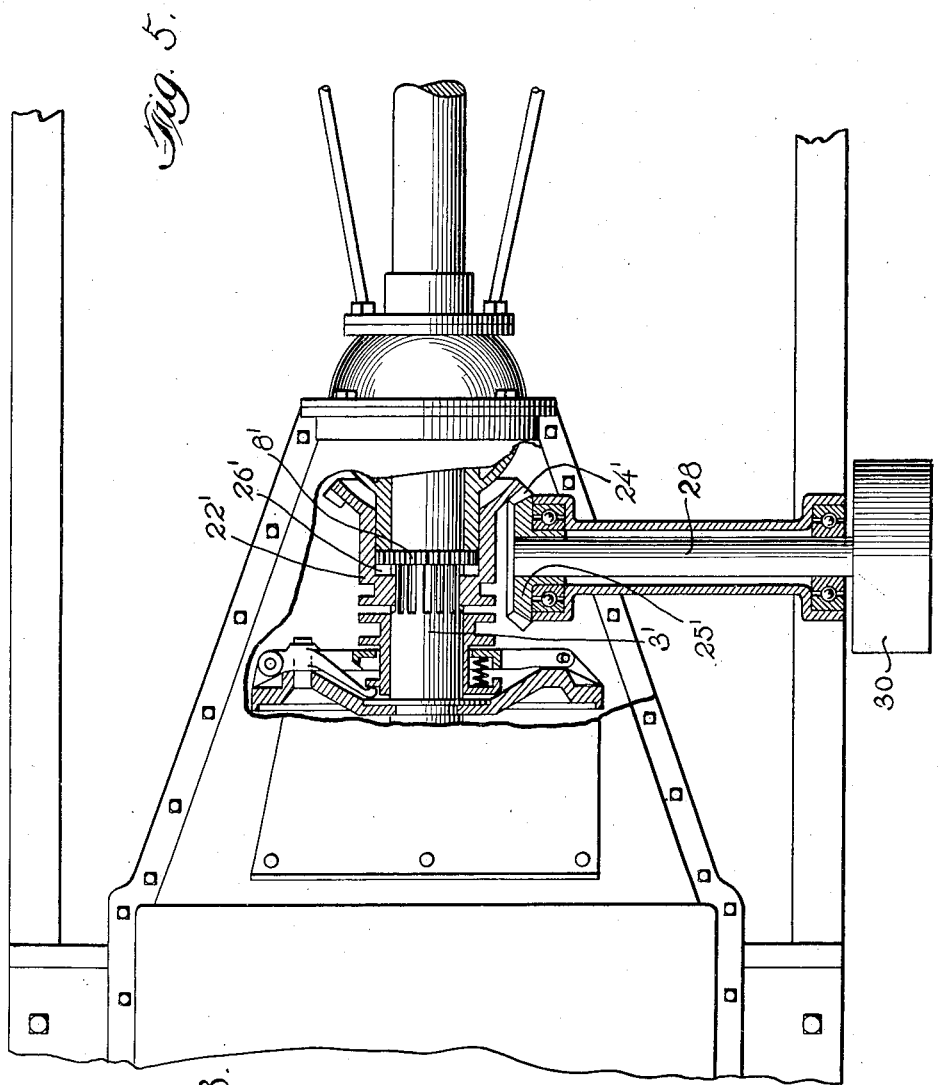
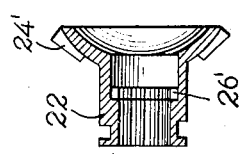
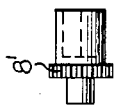
Inventor
Ralph F. Crawford
E. W. Anderson
By
Attorney June 28, 1927.

R. F. CRAWFORD 1,633,847

POWER TAKE-OFF MECHANISM FOR MOTOR VEHICLES

Filed Aug. 12, 1926    4 Sheets-Sheet 4

Inventor
Ralph F. Crawford.
E. W. Anderson

By

Attorney

Patented June 28, 1927.

1,633,847

UNITED STATES PATENT OFFICE.

RALPH F. CRAWFORD, OF SALINA, KANSAS.

POWER TAKE-OFF MECHANISM FOR MOTOR VEHICLES.

Application filed August 12, 1926. Serial No. 128,813.

The invention has relation to transmission mechanism for motor vehicles, having for an object to provide power take-off means applicable to planetary transmission mechanism of the "Ford" type within the limited space between the clutch release collar and the housing for the universal. The invention is also applicable to transmission mechanism of the sliding gear and other types.

The invention consists in the novel construction and combinations of parts as set forth in the appended claims.

Figure 1:
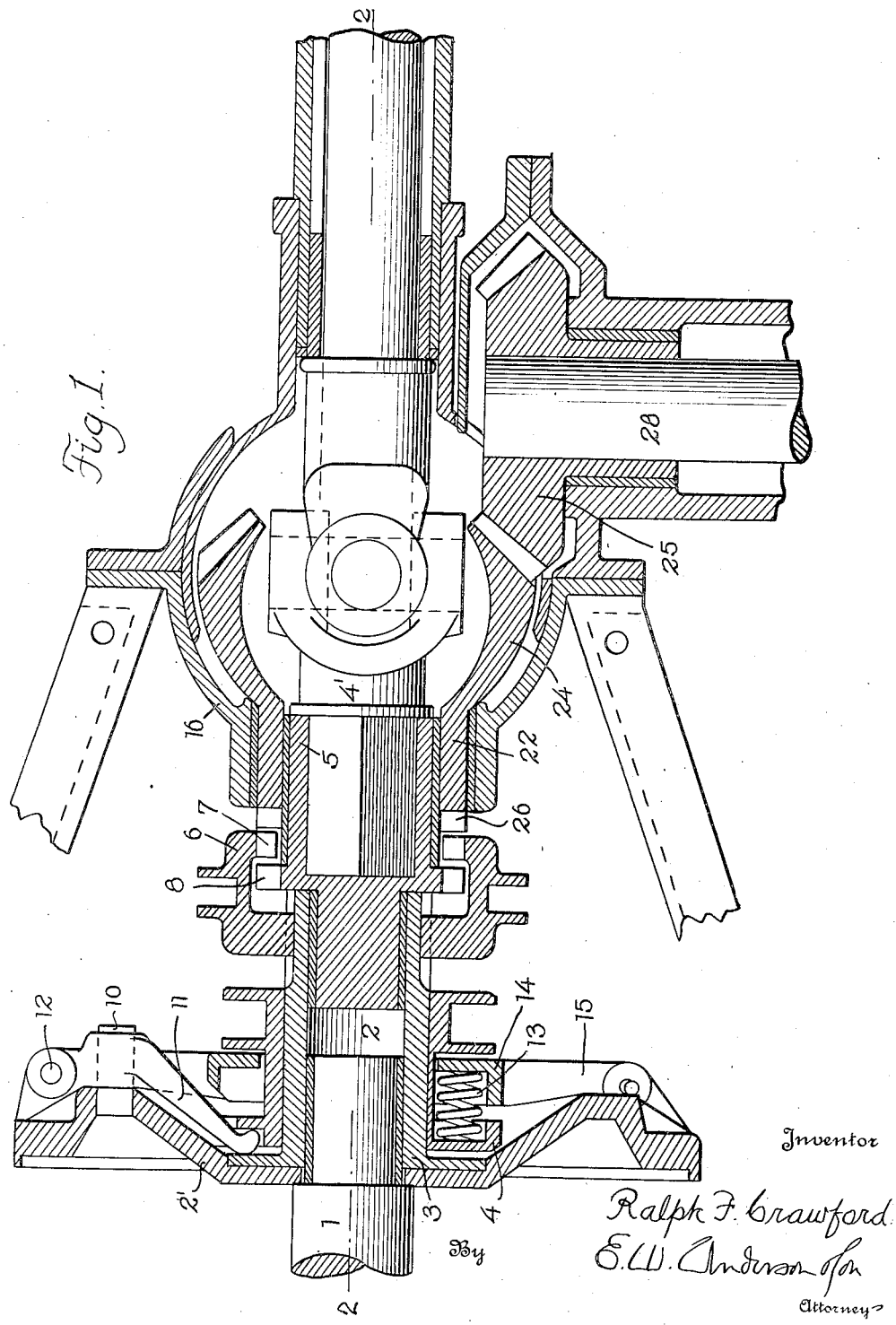
Figure 2:
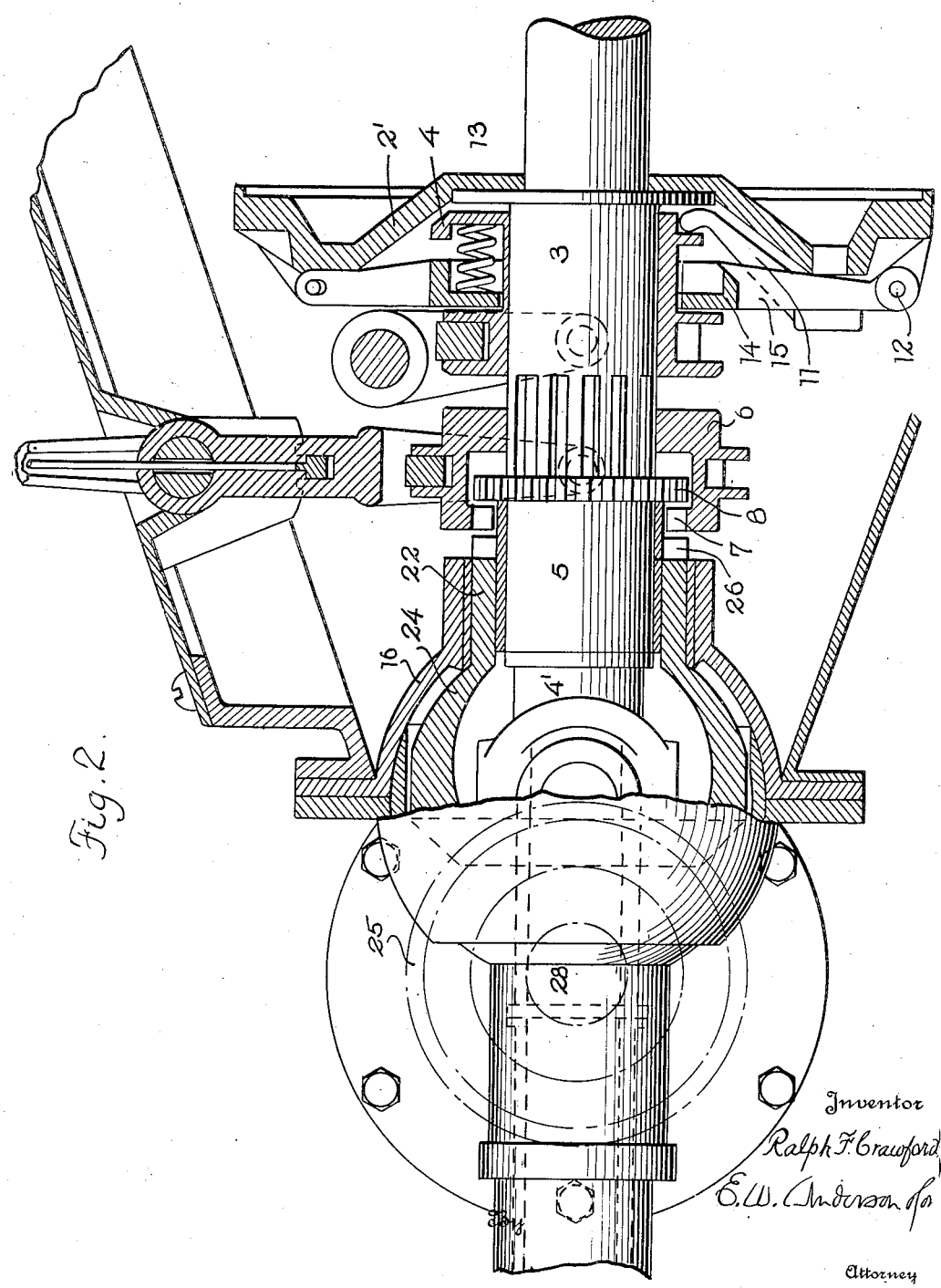
Figure 6:
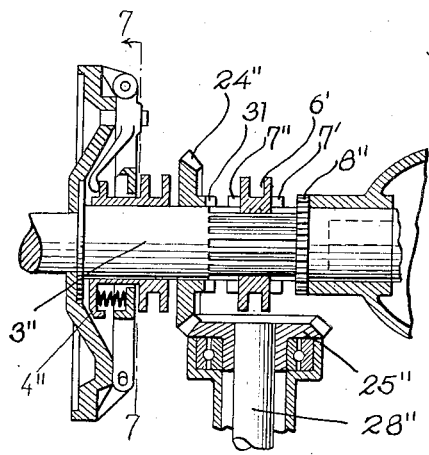
Figure 7:
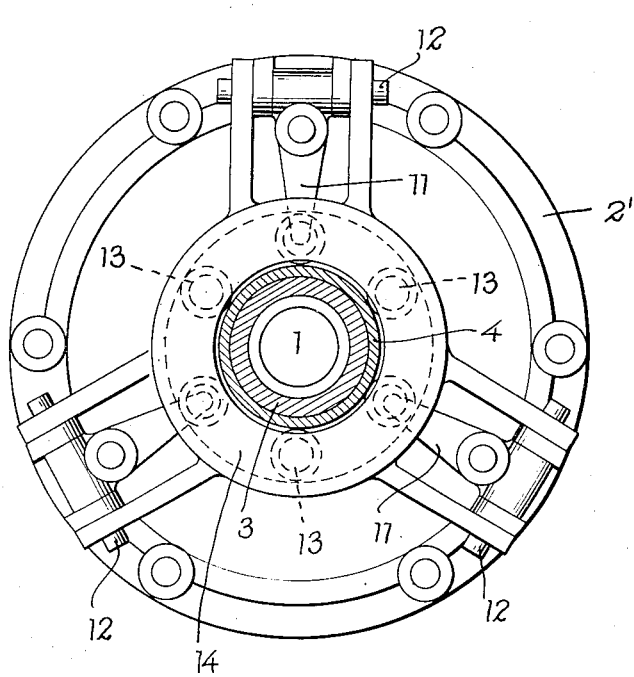

In the accompanying drawings, illustrating an embodiment of the invention, Figure 1 is a central vertical longitudinal section of the invention; Figure 2 is a section on the line 2—2, Figure 1; Figure 3 is a detail section of the clutch sleeve having the hollow bevel gear; Figure 4 is a detail side view of a member of the universal; Figure 5 is a central longitudinal section of a modification partly in full lines; Figure 6 is a longitudinal section of a further modification partly broken away, and Figure 7 is a section on the line 7—7, Figure 6.

In these drawings, the numeral 1 designates the transmission shaft of the vehicle, broken at 2, the forward section having fast thereto the sleeve 3, whereon the clutch release collar 4 is slidably mounted, the rear section of said shaft which carries one member 4' of the universal, having a sleeve 5 fast thereon, the clutch shifting collar 6 being splined upon and having sliding engagement with the sleeve 3, and having clutch teeth 7, adapted for engagement with the clutch teeth 8 of the sleeve 5, to rotate the two sections of the transmission shaft as one.

The transmission plate or cover for the foot brake drum is shown at 2', the clutch disks of said foot brake drum being caused to have frictional engagement to drive the vehicle through the medium of pins working within perforations of said plate and actuated by the clutch finger screws 10 carried by the clutch fingers 11 pivoted upon the stub shafts 12, a plurality of clutch springs 13 being located in annular series between the inner end of said clutch release collar and a stationary annular plate 14, carried by radial arms 15, the outer ends of which are mounted upon said stub shafts 12, the entire assembly of transmission plate, clutch fingers, clutch release collar, and clutch springs being much more compact than usual and admitting of the introduction upon the transmission shaft between the universal housing 16 and the clutch release collar 4, of the clutch shifting collar 6 aforesaid. The clutch shifting collar 6 has an operating lever 17 fulcrumed to the framing at 18.

Located between the sleeve 5 and the housing 16 for the universal, is a sleeve 22 upon and concentric with sleeve 5, and provided within said universal housing with a hollow approximately semispherical bevel gear wheel 24 in mesh with the teeth of a bevel gear wheel 25 of the ordinary type, and which projects at one side within the universal housing. The sleeve 22 has at its opposite end, which is located without the universal housing, clutch teeth 26, with which the clutch teeth 7 of the clutch shifting collar 6 are adapted to be engaged, to transmit the power of the engine through sleeve 3, clutch shifting collar 6, and sleeve 22, to the countershaft 28 fast to the bevel gear 25.

The clutch teeth 26 of the sleeve 22 are spaced from the clutch teeth 8 of the sleeve 5 by an interval, wherein the clutch teeth 7 of the clutch shifting collar 6 may be located in neutral position.

A modification of the invention is shown in Figure 5 of the drawings, wherein the sleeve 22 is substituted by a sleeve 22', splined upon the sleeve 3' and shiftable thereon to bring its interior clutch teeth 26' into mesh with the clutch teeth 8' of the rear shaft section to drive the same, said sleeve 22' carrying at one end a hollow dished bevel gear wheel 24', exterior and adjacent to and surrounding one end portion of the housing of the universal, and adapted in the shifting thereof with the sleeve to be brought into and out of mesh with the teeth of a bevel gear 25' fast upon a countershaft 28', the latter carrying a belt pulley 30, the more compact arrangement of the parts stated making it possible to introduce this shiftable clutch sleeve 22′ upon the transmission shaft between the universal housing and the clutch release collar.

A further modification of the invention is shown in Figures 6 and 7 wherein a bevel gear 24″ is loose upon the sleeve 3″ and in mesh with a bevel gear 25″ upon the countershaft 28″, a clutch shifting collar 6′ being splined to the sleeve 3″ and having at opposite sides clutch teeth 7′ and 7″, adapted respectively for engagement with the clutch teeth 8″ of the rear shaft section to drive the same or with the clutch teeth 31 of the bevel gear 24″ to drive said countershaft, the more compact arrangement of the parts stated making it possible to introduce the bevel gear 24″ and the clutch shifting collar 6′ upon the transmission shaft between the universal housing and the clutch release collar.

I claim:

1. In power take off mechanism for motor vehicles, a drive shaft in two sections, the forward shaft section having a clutch member loose thereon and a clutch member fast thereon and carrying an annular series of clutch springs acting to press the two members of the clutch together, a manually operable device including a shiftable collar upon the forward shaft section for exerting tension upon one end of said springs to release the clutch, the rear shaft section carrying one member of the universal and having clutch teeth, a countershaft, a sleeve upon said rear shaft section provided with clutch teeth and a gearing connection with said countershaft, and means for selectively driving said rear shaft section or said sleeve including shiftable clutch means upon the forward shaft section having clutch teeth and located between the rear shaft section and said shiftable collar.

2. In power take off mechanism for motor vehicles, a drive shaft in two sections, the forward shaft section having a clutch member loose thereon and a clutch member fast thereon and carrying stub shafts, an annular stationary plate having radial arms mounted upon said stud shafts, and an annular series of clutch springs engaging at one end said stationary plate and acting to press the two members of the clutch together, a manually operable device including a shiftable collar upon the forward shaft section for exerting tension upon one end of said springs to release the clutch, the rear shaft section carrying one member of the universal and having clutch teeth, a countershaft, a sleeve upon said rear shaft section provided with clutch teeth and a gearing connection with said countershaft, and means for selectively driving said rear shaft section or said sleeve including shiftable clutch means upon the forward shaft section having clutch teeth and located between the rear shaft section and said shiftable collar.

3. In power take off mechanism for motor vehicles of the Ford type, a drive shaft in two sections, the rear shaft section carrying one member of the universal and having clutch teeth, the forward shaft section carrying the clutch release collar and the foot brake drum having the transmission plate, in combination with an annular series of clutch springs carried by said transmission plate and surrounding and engaging the inner end of said clutch release collar, a countershaft, a sleeve upon said rear shaft section provided with clutch teeth and a gearing connection with said countershaft, and means for selectively driving said rear shaft section or said sleeve including shiftable clutch means upon the forward shaft section having clutch teeth and located between the clutch release collar and said rear shaft section.

4. In power take off mechanism for motor vehicles of the Ford type, a drive shaft in two sections, the rear shaft section carrying one member of the universal and having clutch teeth, the forward shaft section carrying the clutch release collar and the foot brake drum having the transmission plate, said transmission plate having stub shafts, clutch fingers mounted thereon and carrying the clutch screws, an annular stationary plate having radial arms mounted upon said stub shafts, a plurality of clutch springs located between said stationary plate and the inner end of said clutch release collar, a countershaft, a sleeve upon said rear shaft section provided with clutch teeth and a gearing connection with said countershaft, and means for selectively driving said rear shaft section or said sleeve including shiftable clutch means upon the forward shaft section having clutch teeth and located between the clutch release collar and said rear shaft section.

5. In power take off mechanism for motor vehicles of the Ford type, a drive shaft in two sections, the rear shaft section carrying one member of the universal and having clutch teeth, a sleeve fast upon the forward shaft section, a clutch release collar shiftable upon said sleeve, the forward shaft section carrying the foot brake drum, a transmission plate for said drum having stub shafts, clutch fingers mounted thereon and carrying the clutch screws, an annular stationary plate having radial arms mounted upon said stub shafts, a plurality of clutch springs located between said stationary plate and the inner end of said clutch release collar, a countershaft, having a bevel gear wheel, and means for selectively driving said rear shaft section or said countershaft including a sleeve loose upon said rear shaft section and having at one end clutch teeth spaced from the clutch teeth of said rear shaft section, and at the other end a hollow bevel gear wheel in mesh with said first named bevel gear wheel and located within the housing of and adjacent to and surrounding said universal member, and a clutch shifting collar splined to and shiftable upon said fast sleeve and having clutch teeth engageable with the clutch teeth of said rear shaft section or with the clutch teeth of said loose sleeve and movable to neutral position within the space separating the clutch teeth of the rear shaft section and of said loose sleeve.

In testimony whereof I affix my signature.

RALPH F. CRAWFORD.